(12) United States Patent
Ejeblad et al.

(10) Patent No.: US 9,284,082 B2
(45) Date of Patent: Mar. 15, 2016

(54) METHOD AND DEVICE FOR PREPARATION OF PIPING BAGS FOR PREFILLING

(75) Inventors: Allan Ejeblad, Jönåker (SE); Timo Järvinen, Norrköping (SE)

(73) Assignee: KEE PLASTICS AB, Norrkoping (SE)

( * ) Notice: Subject to any disclaimer, the term of this patent is extended or adjusted under 35 U.S.C. 154(b) by 1129 days.

(21) Appl. No.: 13/128,923

(22) PCT Filed: Nov. 13, 2008

(86) PCT No.: PCT/EP2008/065500
§ 371 (c)(1),
(2), (4) Date: Dec. 22, 2011

(87) PCT Pub. No.: WO2010/054692
PCT Pub. Date: May 20, 2010

(65) Prior Publication Data
US 2012/0096812 A1   Apr. 26, 2012

(51) Int. Cl.
*B65B 3/02* (2006.01)
*B65B 43/12* (2006.01)
*A21C 15/00* (2006.01)
*B65B 43/26* (2006.01)

(52) U.S. Cl.
CPC ............. *B65B 43/123* (2013.01); *A21C 15/005* (2013.01); *B65B 43/262* (2013.01)

(58) Field of Classification Search
CPC ............ B65B 3/02; B65B 43/38; B65B 43/00
USPC ............................ 53/384.1, 452, 459; 383/105
See application file for complete search history.

(56) References Cited

U.S. PATENT DOCUMENTS

| 3,445,982 | A | * | 5/1969 | Schweikert | 53/452 |
| 3,448,915 | A | * | 6/1969 | Schwarzkopf | 383/37 |
| 4,423,583 | A | * | 1/1984 | Carey | 52/373 |
| 5,221,567 | A | * | 6/1993 | Baker | 428/43 |
| 5,335,485 | A | * | 8/1994 | Cappi et al. | 53/570 |
| 6,021,628 | A | * | 2/2000 | Jostler et al. | 53/469 |

(Continued)

FOREIGN PATENT DOCUMENTS

DE    32 34 877 A1    3/1984
DE    33 26 616 A1    1/1985

(Continued)

OTHER PUBLICATIONS

The First Office Action—Chinese Appln. No. 200880132604.4; Issue Date: Apr. 2, 2013.

(Continued)

*Primary Examiner* — Nathaniel Chukwurah
(74) *Attorney, Agent, or Firm* — Hamre, Schumann, Mueller & Larson, P.C.

(57) ABSTRACT

A method for preparing a piping bag for pre-filling, the set comprising, a thin walled polymer tube, and at least one severance mark extending across the entire width of the polymer tube, partitioning the set into two separable piping bags having a respective openable portion, said openable portions pointing in substantially opposite directions, as seen in a longitudinal direction of the set. The method comprises gripping the set at or near the respective openable portion, positioning the openable portions to point in substantially the same direction, and separating the piping bags from each other along the severance mark.

15 Claims, 5 Drawing Sheets

(56) References Cited

U.S. PATENT DOCUMENTS

| | | | |
|---|---|---|---|
| 6,234,777 B1* | 5/2001 | Sperry et al. .................... 425/46 |
| 7,077,393 B2* | 7/2006 | Ishida ............................. 270/37 |
| 2002/0026861 A1 | 3/2002 | Reinders | |
| 2005/0263014 A1* | 12/2005 | Ejeblad .......................... 99/494 |
| 2008/0098697 A1* | 5/2008 | Murray ........................... 53/457 |
| 2009/0272079 A1* | 11/2009 | Pluckrose et al. ............. 53/452 |

FOREIGN PATENT DOCUMENTS

| | | |
|---|---|---|
| DE | 2007/081272 A1 | 7/2007 |
| GB | 681096 A | 10/1952 |
| TW | 512122 | 12/2002 |
| WO | 2005/115162 A1 | 12/2005 |
| WO | 2006/015447 A2 | 2/2006 |
| WO | 2010/054692 A1 | 5/2010 |

OTHER PUBLICATIONS

International Preliminary Report on Patentability; PCT/EP2008/065500.

International Preliminary Report on Patentability; PCT/EP2008/065128.

International Search Report; mailed Jul. 8, 2009 Appln. PCT/EP2008/065500.

English Translation of Taiwanese Office Action for Taiwan Application No. 098138145, dated Oct. 9, 2014, 4 pages.

* cited by examiner

METHOD AND DEVICE FOR PREPARATION OF PIPING BAGS FOR PREFILLING

TECHNICAL FIELD

The present document relates to a method for preparing a piping bag set for pre-filling.

BACKGROUND

When preparing piping bags for pre-filling the bags are usually separated individually from e.g. a continuous web comprising numerous piping bags. The individual bag may then be filled, or strictly speaking pre-filled, with substances in a substantially viscous liquid or fluid form, e.g. foodstuffs, glue, cement, plaster; and subsequently sealed shut.

This operation is usually time consuming as one bag at a time must be separated from the web of piping bags and arranged such as to allow for the liquid to be filled in the individual piping bag.

WO 2007/081272 A1 discloses a pair of joined webs of sequentially disposed package blanks. The package blanks are held together by a continuous retaining means extending in a longitudinal direction of the web. The package blanks are fastened, at their respective first ends at the retaining means. The webs are joined to each other at the respective second ends of the package blanks. The package blanks may be separated at a separation mark arranged at the seconds ends. The package blanks may be fed onto the retaining means from a continuous tube blank provided on a reel, and fastened to the retaining means adjacent to the first openings on the outside of the respective walls of the package blanks. This method may lead to substantial waste of material, since the first ends are melted or welded to the retaining means and subsequently need to be cut off from the retaining means. This system may also lead to en expensive conversion and hence more expensive bags.

WO 2006/015447 A2 discloses an apparatus and method for forming and pre-filling packaging. A plastic film of packaging material, alternatively including preformed bags, wherein the adjacent bags are disposed in opposing relation to one another, is fed to filling and sealing stations. The plastic film, comprising the bags, is fed through a series of rollers to a supply exit, where the bags are received by carriages and transported to respective filling and sealing stations. The first bag is received by a first carriage in an up-right position and may be directly transported to its filling and sealing stations. The second bag must however be inverted before transportation to its respective filling and sealing station. After the bags have been filled and sealed they may be dropped onto a conveyor.

DE 32 34 877 A1 discloses a device and method for producing bags from a tube of plastic materials and filling these bags. The tube is fed by a roller and cut and welded at a lower end and then, at a predetermined distance from the lower end, cut at an upper end. The upper portion of the bag formed thereby may subsequently be held by a suction device. One portion of the suction device is moveable relative to the other, and hence may allow for the upper portion of bag to opened, while the lower, sealed portion is directed downwardly. The opened bag may be filled and sealed and finally dropped onto e.g. a conveyor. This document hence discloses a method where one bag at a time may be opened and filled.

There is a need for an alternative method for preparing package blanks, such as piping bags disclosed in WO 2005/115162 A1 for pre-filling of various foodstuff liquids.

SUMMARY

It is an object of the present disclosure, to provide an improved or alternative method for preparing piping bags for pre-filling.

The object is wholly or partially achieved by a method according to the appended independent claims. Embodiments are set forth in the appended dependent claims, and in the following description and drawings.

According to a first aspect there is provided a method for preparing a piping bag set for pre-filling. The set comprises a thin walled polymer tube, and at least one severance mark extending across the entire width of the polymer tube, partitioning the set into two separable piping bags having a respective openable portion, said openable portions pointing in substantially opposite directions, as seen in a longitudinal direction of the set. The method comprises gripping the set at or near the respective openable portion, positioning the openable portions to point in substantially the same direction, and separating the piping bags from each other along the severance mark.

To this end there may be provided a method for preparing piping bags for pre-filling which is fast and feasible since two piping bags simultaneously may be positioned such that their openable portions point in the same direction.

By "same direction" is meant that the bags may have their respective openable portions turned towards the same direction e.g. substantially upwardly.

The polymer tube may be formed from a blown seamless tube or a converted tube with at least one longitudinal joint. The joint may be formed by e.g. welding.

The openable portions may be positioned to point towards substantially the same direction before the piping bags are separated from each other.

This may allow for a more efficient method of operation.

According to the first aspect the set may consist of two piping bags separable by the severance mark. By severance mark is mean e.g. a weakened line, possibly perforated or welded.

The provision of a severance mark may allow for an easier separation of the piping bags.

According to the first aspect the separating step may comprise gripping one of the piping bags substantially at a point at a long side portion of the piping bag, and pulling at the point in a direction away from the direction in which the openable portions are pointing.

According to one alternative of the first aspect the separating step may comprise gripping both piping bags substantially at a respective point at a long side portion of the respective piping bag, and pulling at the point in a direction away from the direction in which the openable portions are pointing.

The set may be separated from at least one further set before separating the first and second piping bags.

The set may be separated from a continuous web comprising a plurality of sets.

According to a second aspect there is provided a method for pre-filling piping bags, wherein the bags may have been prepared for pre-filling according to the first aspect. The method comprises holding each piping bag at its respective openable portion, opening each piping bag, filling each piping bag with a fluid or semi-fluid material, and closing each openable portion.

By this operating method the pre-filling of piping bags may be improved or, in effect sped up, in that two bags may be opened, pre-filled and closed substantially simultaneously.

By "closing the openable portions" is meant that the sides of the thin walled polymer tube is sealed shut, e.g. by welding, gluing or hot melting.

According to a third aspect there is provides a device for preparing a piping bag set for pre-filling. The device comprises a feeder for feeding a piping bag set, comprising a set of separable piping bags having openable portions which point towards different directions and a pair of gripping devices. The gripping devices being arranged to grip a respective piping bag at its openable portion, displaceable relative to each other in feed direction of the piping bag set, and rotatable for redirecting the openable portions of the piping bags.

By this device there may be provided a simple and easy way of preparing at least two piping bags for pre-filling simultaneously.

The feeder may comprise a driven pair of rollers.

The pair of rollers may be bidirectionally drivable.

This may allow for an easy separation of a first set of piping bags from a second, adjoining, set of piping bags, in that the rollers may be utilized to facilitate the separation by e.g. reversing their rotational direction while the first set is held by the gripping devices.

The device according to the third aspect may further comprise a bag opener, positionable between the gripping devices, and configured to open at least one of the piping bags.

The device according to the third aspect may further comprise a separator, configured to separate the piping bags of the set from each other.

The separator may comprise a gripper configured to grip substantially a point at an edge of one of the piping bags, the gripper being substantially vertically movable for separating the piping bags from each other.

BRIEF DESCRIPTION OF THE DRAWINGS

Embodiments of the present solution will now be described, by way of example, with reference to the accompanying schematic drawings.

DESCRIPTION OF EMBODIMENTS

In the following the expression "longitudinal" refers to a direction which essentially coincides with line A-A of FIG. 2a, the longitudinal edges of the set are indicated by 12 and 12' respectively.

Figure 2A:
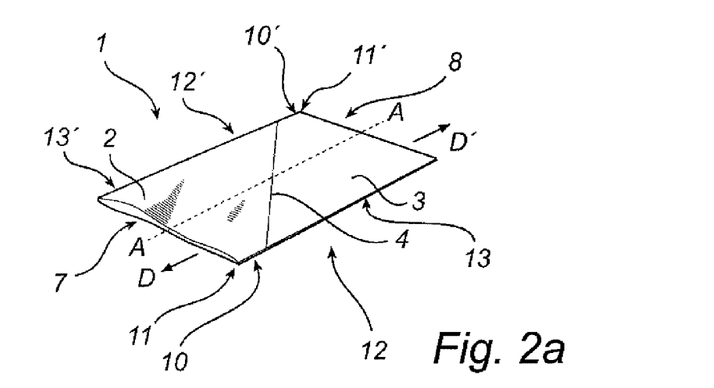
FIGS. 2a-2c illustrates schematic perspective views of a piping bag set.

The term "transversal" refers to a direction perpendicular to the line A-A of FIG. 2a.

Figure 1:
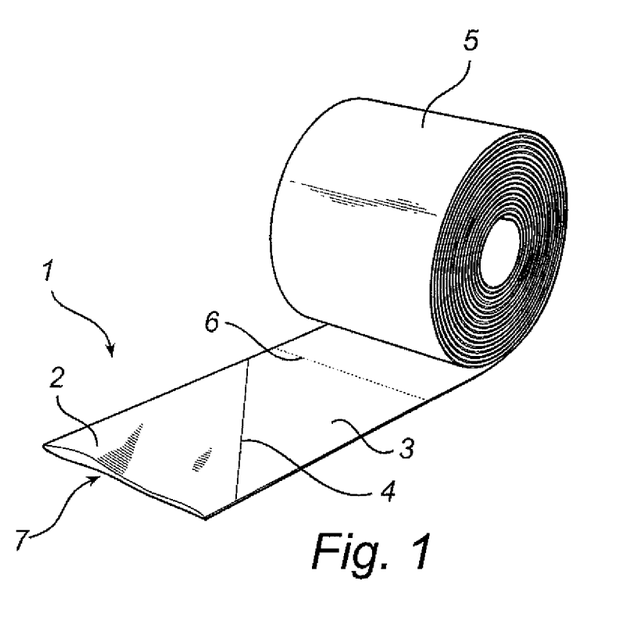
FIG. 1 illustrates a schematic side view of a piping bag roll.

FIG. 1 illustrates a piping bag roll 5 from which a piping bag set 1 may be extracted. Two piping bag sets 1, 1' may be separable from each other by a severance mark, for instance comprising a perforated or otherwise weakened and possibly welded line 6.

As shown in FIGS. 1 and 2a the bags may be open, but they may also, in the alternative, be sealed shut, e.g. by a weak welding.

FIG. 2a illustrates a piping bag set 1. The set 1 comprises a thin walled polymer tube comprising a severance mark 4. The polymer tube may be formed from a continuously extruded and blown polymer tube, or it may be in the form of a converted tube, i.e. a tube formed by folding a polymer film sheet and joining it along a longitudinal or helical edge, or by joining two or more film sheets. The severance mark 4 may define two piping bags 2, 3 that are separable at the severance mark 4. The first and second piping bags 1 may comprise first and second openable portions 7 and 8, respectively. The openable portions 7, 8 may point towards opposite directions, shown by the arrows D, D'.

The severance mark 4 may be arranged to obliquely transverse the piping bags. The mark 4 may further be arranged to cross the piping bag set either from one corner 11 of the first piping bag 2 to the opposite corner 11' of the second piping bag 3, or be arranged such that there is a distance 10, 10' from the openable portion 7, 8 to the severance mark 4 along a longitudinal edge 12, 12' of the thin walled polymer tube. The severance mark 4 may define a partition of the longitudinal edge 12 into a distance portion 10, 10' and a long side portion 13, 13'.

The openable portions 7, 8 may comprise a transversely extending opening of the piping bags 2, 3. The opening may be sealed by a lightly or weak welded portion (not shown) arranged at the opening and extending at least partially across the length of the opening.

Figure 2B:
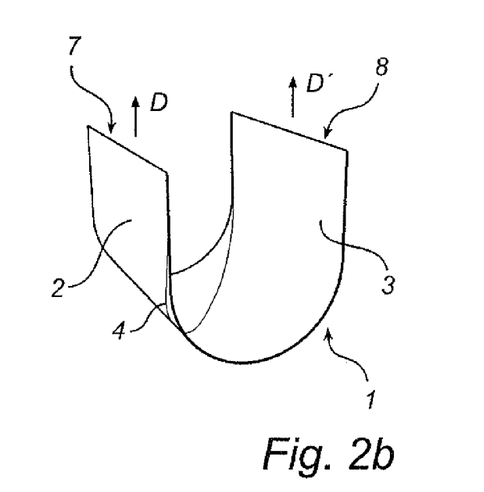

FIG. 2b illustrates a piping bag set 1 where the openable portions 7, 8 are pointed towards substantially the same direction or substantially parallel, shown by the arrows D, D'. The piping bag set 1 thereby forms substantially an U-shape.

Figure 2C:
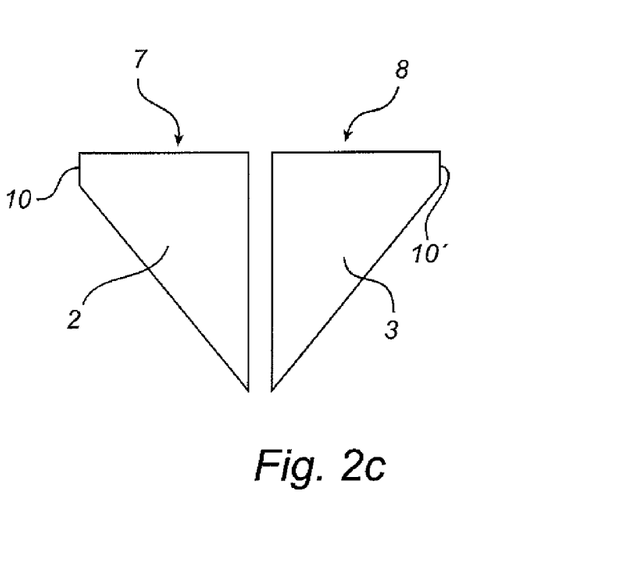

FIG. 2c illustrates two separated piping bags 2, 3.

In the following, one alternative embodiment of the method for preparing a piping bag set for pre-filling will be described, with reference to FIGS. 3a-3f.

The various devices described below may be of a conventional types well known in the packaging industry. In one embodiment the gripping devices may be of a suction type, such as disclosed in DE 33 26 616 A1. In the alternative, gripping devices using vacuum may be used.

Figure 3A:
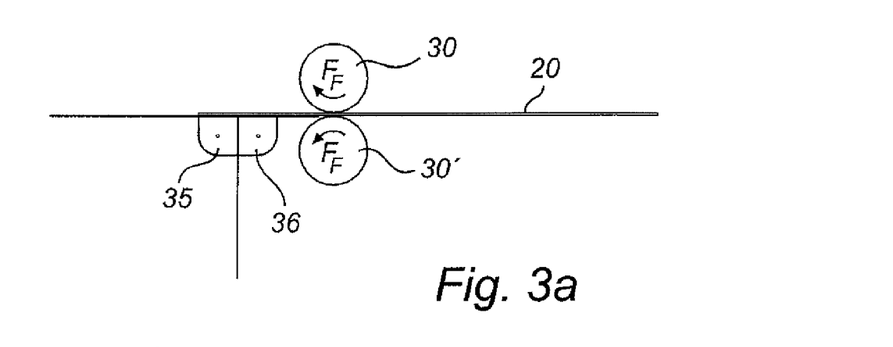
FIGS. 3a-3f illustrates schematically different stages of the preparation of the piping bag set for pre-filling by a device according to the present solution.

As shown in FIG. 3a, a continuous web 20 of piping bag sets may be fed through a feeder such as a pair of feed rollers 30, 30'. A first gripping device 35 may grip a piping bag set 1 at or near a first openable portion 7.

The gripping device 35 may grip across the entire transversal length of the openable portion 7. Alternatively the gripping device may grip at portions of the openable portion 7. The gripping device may grip the outermost end of the set or at a distance from the openable portion.

Figure 3B:
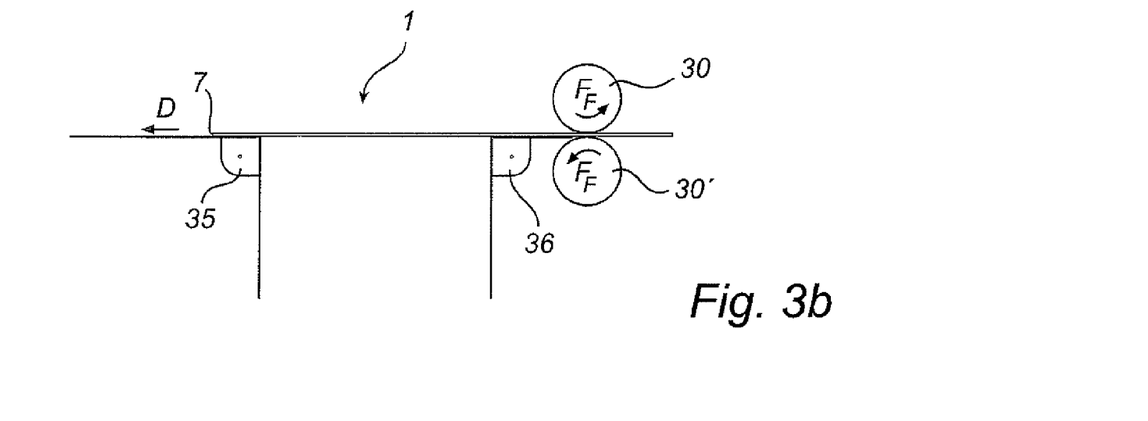

While still gripping at the first openable portion 7, the first gripping device 35 may move in a direction $R_1$, away from a second gripping device 36, as is shown in FIG. 3b.

The second gripping device 36 may subsequently grip the second openable portion 8, when the first gripping device 35 has moved the continuous web 20, such that the second openable portion 8 is aligned with the second gripping device 36.

Figure 3C:
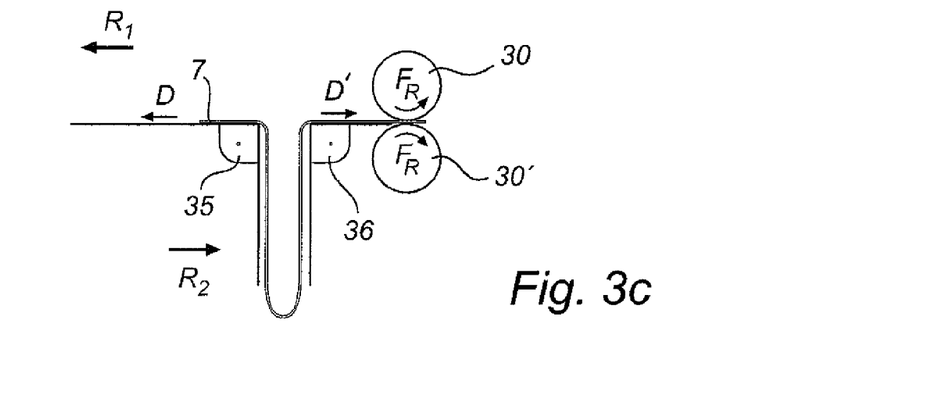

By moving the first gripping device 35 in a direction $R_2$ towards the second gripping device 36, shown in FIG. 3c, the piping bag set 1 may be caused to fall down between the gripping devices 35, 36 and thereby forming essentially an U-shape.

The piping bag set 1 may be separated from the continuous web of sets 20, by reversing the rotational movement, indicated by the arrow $F_R$ in FIG. 3c, of the feed rollers 30, 30', such that the first piping bag set 1 is separated from the web 20 along the weakened line 5, which is indicated by arrow C. This means that the feed rollers alternatively may be bidirectionally driven.

Alternatively the set 1 may be separated from the web 20 by a separating device (not shown), e.g. a cutter.

It is also possible to provide the weakened and possibly welded line 6 in connection with the separation of the set 1 from the web 20.

Once the set 1 has been separated from the web 20, the openable portions 7, 8 may be directed in the opposite directions as indicated by arrows D and D'.

Figure 3D:
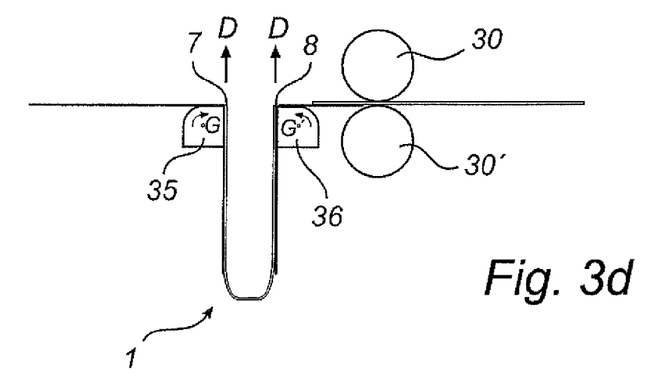

In FIG. 3*d*, arrows G, G' indicates that the gripping devices 35, 36 may be rotated such that the openable portions 7, 8 point towards substantially the same direction, shown by arrows D, D'.

The piping bag set 1 may then be separated along the severance mark 4, in order to form two separate piping bags 2, 3.

Figure 4:
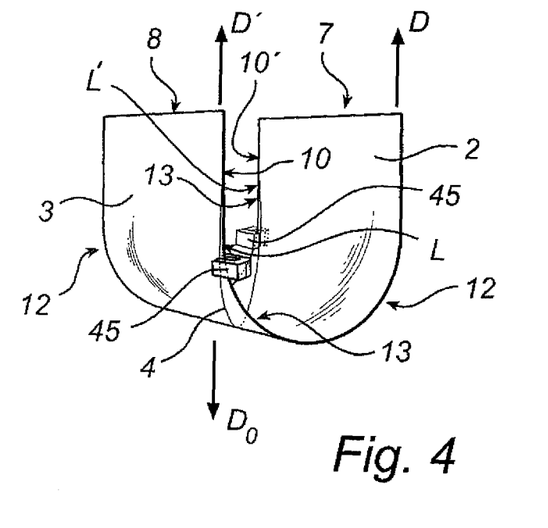
FIG. 4 illustrates a schematic perspective view of a piping bag set.

According to one alternative, the separation of the two piping bags 2, 3 may be performed by one or more separators or alternatively a gripper or gripping devices 45 shown in FIG. 4, which grip the bags 2, 3 on one or both longitudinal edges 12, 12', at a respective point L, L' near the severance mark 4 and pull the respective bag or bags in a direction $D_o$ away from the direction D in which the openable portions are pointing, thereby causing the set 1 to divide into two separate bags 2, 3.

The point L, L' may be situated on the long side portion 13, 13' of the longitudinal edge 12, 12', and may define an outermost portion of an obliquely cut part of the respective piping bag.

Figure 3E:
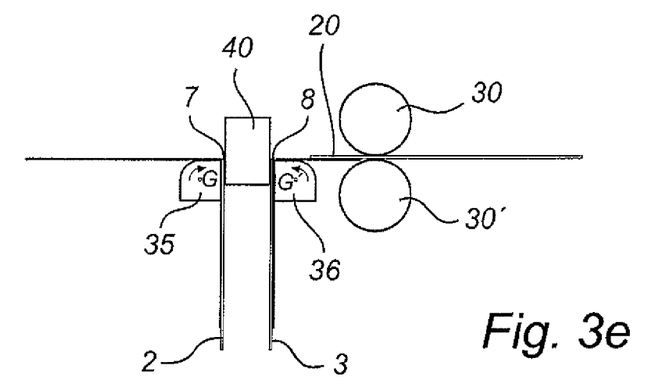

In FIG. 3*e* the bags 2, 3 have been separated from each other and their respective openable portions 7, 8 point towards the same direction, as indicated by arrows D, D'.

According to one alternative, a third gripping device 40, or alternatively a bag opener may be introduced between the bags 2, 3. The third gripping device 40 may grip the bags at or near the openable portions 7, 8 such as to grip the bag at the opposite side of the first and second gripping devices 35, 36.

The gripping device 40 may be an integrated device or comprise different portions or parts for engagement with each piping bag 2, 3 separately.

Figure 3F:
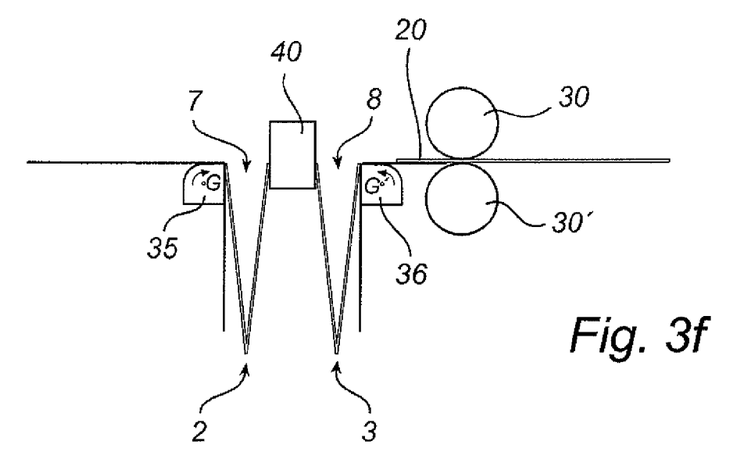

As shown in FIG. 3*f*, the gripping devices 35, 36, 40 may cause the piping bags 2, 3 to open at their openable portions 7, 8, and thereby allowing for a fluid or semi-fluid to be filled therein (not shown).

Subsequent to filling the bags, the openable portions 7, 8 may be sealed, e.g. welded shut, and transferred to e.g. a conveyor.

According to one alternative the gripping devices 35, 36, 40 continue to hold the piping bags after they have been sealed shut, and may hence allow for the filled bags to be safely lowered onto the conveyor.

The invention claimed is:

1. A method for preparing a piping bag set for pre-filling comprising:
   providing a set comprising a thin walled polymer tube, and at least one severance mark extending across the entire width of the polymer tube, the severance mark being arranged for partitioning the set into two separable piping bags having a respective openable portion, said openable portions pointing in substantially opposite directions, as seen in a longitudinal direction of the set;
   gripping the set at or near the respective openable portion;
   positioning the openable portions to point in substantially the same direction; and
   separating the piping bags from each other along the severance mark while retaining the grip.

2. The method as claimed in claim 1, wherein the openable portions are positioned to point towards substantially the same direction before the piping bags are separated from each other.

3. The method as claimed in claim 1, wherein the set consists of two piping bags separable by the severance mark.

4. The method as claimed in claim 1,
   wherein the separating step comprises:
   gripping one of the piping bags substantially at a point (L, L') at a long side portion of the piping bag; and
   pulling at the point (L, L') in a direction ($D_o$) away from a direction (D, D') in which the openable portions are pointing.

5. The method as claimed in claim 4, wherein the separating step comprises:
   gripping both piping bags substantially at a respective point (L, L') at a long side portion of the respective piping bag; and
   pulling at the point (L, L') in a direction ($D_o$) away from the direction (D) in which the openable portions are pointing.

6. The method as claimed in claim 1, wherein the set is separated from at least one further set before separating the first and second piping bags.

7. The method as claimed in claim 6, wherein the set is separated from a continuous web comprising a plurality of sets.

8. A method for pre-filling piping bags, said piping bags being prepared for pre-filling by the method of claim 1, the method comprising:
   holding each piping bag at its respective openable portion,
   opening each piping bag,
   filling each piping bag with a fluid or semi-fluid material; and
   closing each openable portion.

9. A device for preparing a piping bag set for pre-filling, the device comprising:
   a feeder for feeding a piping bag set, wherein the piping bag set comprises a set of separable piping bags having openable portions which point towards different directions; and
   a pair of gripping devices, arranged to grip a respective piping bag at its openable portion;
   the gripping devices being displaceable relative to each other in feed direction of the piping bag set, and the gripping devices being rotatable for redirecting the openable portions of the piping bags.

10. The device as claimed in claim 9, wherein the feeder comprises a driven pair of rollers.

11. The device as claimed in claim 10, wherein the pair of rollers is bidirectionally drivable.

12. The device as claimed in claim 9, further comprising a bag opener, positionable between the gripping devices, and configured to open at least one of the piping bags.

13. The device as claimed in claim 9, further comprising a separator, configured to separate the piping bags of the set from each other.

14. The device as claimed in claim 13, wherein the separator comprises a gripper configured to grip substantially a point at an edge of one of the piping bags, the gripper being substantially vertically movable for separating the piping bags from each other.

15. The method as claimed in claim 1, wherein the openable portions pointing in substantially opposite directions as seen in a longitudinal direction of the set are parallel with the tube in the longitudinal direction.

* * * * *